United States Patent
Sayyah

(10) Patent No.: US 7,324,256 B1
(45) Date of Patent: Jan. 29, 2008

(54) PHOTONIC OSCILLATOR

(75) Inventor: Keyvan Sayyah, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 11/023,918

(22) Filed: Dec. 27, 2004

(51) Int. Cl.
*G02F 1/03* (2006.01)

(52) U.S. Cl. .................. 359/245; 359/246; 359/239

(58) Field of Classification Search ............. 359/245
See application file for complete search history.

(56) References Cited

U.S. PATENT DOCUMENTS 5,717,708 A * 2/1998 Mells ..................... 372/32
5,929,430 A * 7/1999 Yao et al. ............... 250/205
6,888,887 B1 * 5/2005 Shattil ..................... 375/239
7,061,335 B2 * 6/2006 Maleki et al. ............ 331/66

OTHER PUBLICATIONS

Metzler, G., et al., "RF Small-Signal Equivalent Circuit of MQW InGaAs/InAlAs Electroabsorption Modulator," *Electronics Letters*, vol. 33, No. 21, pp. 1822-1823 (Oct. 9, 1997).

* cited by examiner

*Primary Examiner*—Jessica T Stultz
(74) *Attorney, Agent, or Firm*—Ladas & Parry

(57) ABSTRACT

A photonic oscillator includes an optical transceiver that serves the dual purpose of detecting a feedback RF lightwave signal carried on a laser beam and electrically filtering the RF lightwave signal to modulate the RF lightwave signal in accordance therewith, to thereby set up steady state oscillations in the modulated RF lightwave signal and thereby generate a multi-tone oscillating lightwave.

10 Claims, 3 Drawing Sheets

PHOTONIC OSCILLATOR

STATEMENT REGARDING FEDERALLY SPONSORED RESEARCH OR DEVELOPMENT

The present invention was made with support from the U.S. Government under Contract No. F33615-00-C-1674 for an Agile Waveform Generator. The U.S. Government has certain rights in the invention.

TECHNICAL FIELD

This disclosure relates to photonic oscillators, and more particularly to a photonic oscillator having an opto-electronic feedback loop.

BACKGROUND

RF oscillators, especially voltage controlled oscillators (VCOs), are essential to RF communication, broadcasting, and receiving systems, and can function to generate, track, clean, amplify, and distribute RF carriers. VCOs in a phase-locked loop configuration can also be used for clock recovery, carrier recovery, signal modulation and demodulation, and frequency synthesizing.

Photonic RF systems embed photonic technology into traditional RF system designs to employ optical waves as carriers for transporting RF signals via optical fibers to remote locations. Additionally, certain RF signal-processing functions such as signal mixing, antenna beam steering, and signal altering can also be accomplished in the optical domain. Photonic technology offers many advantages including low loss, light weight, high frequency, high security, remoting capability, and immunity to electromagnetic interference, all highly desirable in most RF systems.

Conventionally, generating a high-frequency RF signal in the optical domain has been accomplished by modulating a diode laser or an external electro-optical (E/O) modulator using a high-frequency stable electrical signal from a local oscillator (LO). Such an LO signal is generally obtained by multiplying a low-frequency reference such as a quartz oscillator to the required high frequency with several stages of multipliers and amplifiers. Consequently, the resulting system is bulky, complicated, inefficient, and costly. Another known alternative for generating photonic RF carriers entails mixing two lasers with different optical frequencies. However, the resulting bandwidth of the signal is wide (limited by the spectral width of the lasers, typically greater than tens of kilohertz) and the frequency stability of the beat signal is poor due to the drift of the optical frequency of the two lasers.

A relatively recent improvement in photonic RF systems is the photonic oscillator, which can provide very low phase noise multi-tone RF oscillations and essentially is a special VCO with both optical and electrical outputs. Fundamentally, the absorption of a light wave supplied to an end of a semiconductor optical absorption layer is controlled by changing the intensity of an electric field applied to the semiconductor optical absorption layer. With reference to FIG. 1, a conventional multi-tone photonic oscillator 10 includes a laser source 100, an optical modulator 110, one or two lightwave delay paths 130, 132 and related beam splitter 120, a photodetector 140, 142 for each delay path and optionally an RF coupler 150, a low-noise electrical amplifier 160, an RF coupler 180 to divide out the signal carrier and the feedback signal, and a RF bandpass filter 190.

Laser light emitted by the laser source 100 supplies the power for the oscillator 10 and is modulated by the feedback RF signal at the electrical input of the optical modulator 110. The modulated lightwave is then sensed by photodetectors 140, 142 whose electrical output is fed back to the modulator 110 following amplification by the amplifier 160 and bandpass filtering by the filter 190. The bandpass filter 190 thus sets the bandwidth of the generated RF multitone comb spectrum.

Photonic oscillators are finding widespread use in a variety of radar and communication applications, all of which would benefit from simpler, more compact oscillator designs. Therefore, what is needed is a method and apparatus for further simplified low phase noise carrier signal generation. The embodiments of the present disclosure answer this and other needs.

SUMMARY

In a first embodiment disclosed herein, a photonic oscillator includes an optical combiner configured to combine a laser beam with a second RF lightwave signal to generate a first RF lightwave signal, an optical transceiver configured to detect the first RF lightwave signal, electrically filter the detected first RF lightwave signal, and modulate the detected first RF lightwave signal in accordance with the filtered first RF lightwave signal, an optical delay path configured to delay the modulated first RF lightwave signal, and an optical splitter configured to split the delayed modulated first RF lightwave signal into the second RF lightwave signal and a third RF lightwave signal.

In another embodiment disclosed herein, a method for generating an optical oscillating signal includes generating a laser beam, combining the laser beam with a second RF lightwave signal to generate a first RF lightwave signal, detecting the first RF lightwave signal in an optical transceiver, electrically filtering the detected first RF lightwave signal in the optical transceiver, modulating the detected first RF lightwave signal in accordance with the filtered first RF lightwave signal in the optical transceiver, delaying the modulated first RF lightwave signal, and splitting the delayed modulated first RF lightwave signal into the second RF lightwave signal and a third RF lightwave signal.

In a further embodiment disclosed herein, the optical transceiver may be an electroabsorption optical transceiver.

These and other features and advantages will become further apparent from the detailed description and accompanying figures that follow. In the figures and description, numerals indicate the various features, like numerals referring to like features throughout both the drawings and the description.

DETAILED DESCRIPTION

Briefly reviewing the operating principles of a multi-tone photonic oscillator, random electrical noise generated in the feedback loop modulates the laser light, which then propagates through the optical delay path and is photodetected to then be regeneratively fed back to the transceiver (or modulator). This constitutes a positive feedback if the open loop gain of the oscillator is greater than one. The amplification of the noise signal as a result of positive feedback occurs at frequency intervals ($\Delta f$) equal to an integer multiple of the inverse of the loop delay time ($\tau$), i.e. $\Delta f = k \div \tau$, where k is an integer. This gives rise to potential multi-tone oscillations at the above frequency intervals. The delay loop also acts as a storage medium to increase the quality factor (Q) of the oscillator, which is proportional to the square of the loop's delay time ($Q = 2\Pi f \tau^2/\delta$), where f is the oscillation frequency and $\delta$ is the noise-to-signal ratio of the input to the oscillator. Thus, the oscillator phase noise S(f'), which is inversely proportional to the quality factor $S(f') = \delta/[(2\Pi)^2(\tau f')^2]$, where f' is the offset frequency, decreases quadratically as the optical delay in the loop is increased.

Figure 1:
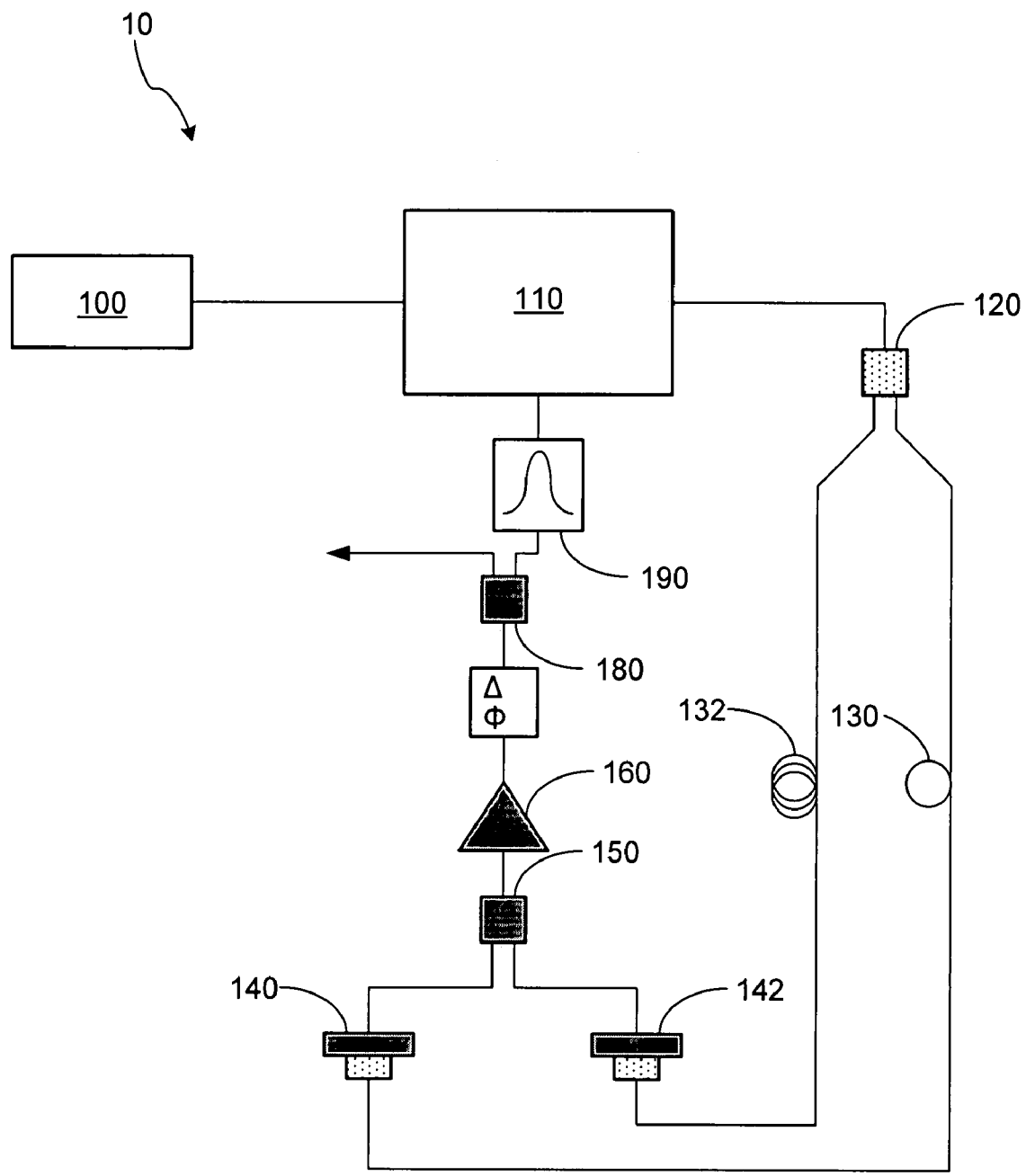
FIG. 1 is a block diagram of a conventional multi-tone photonic oscillator.
Figure 2:
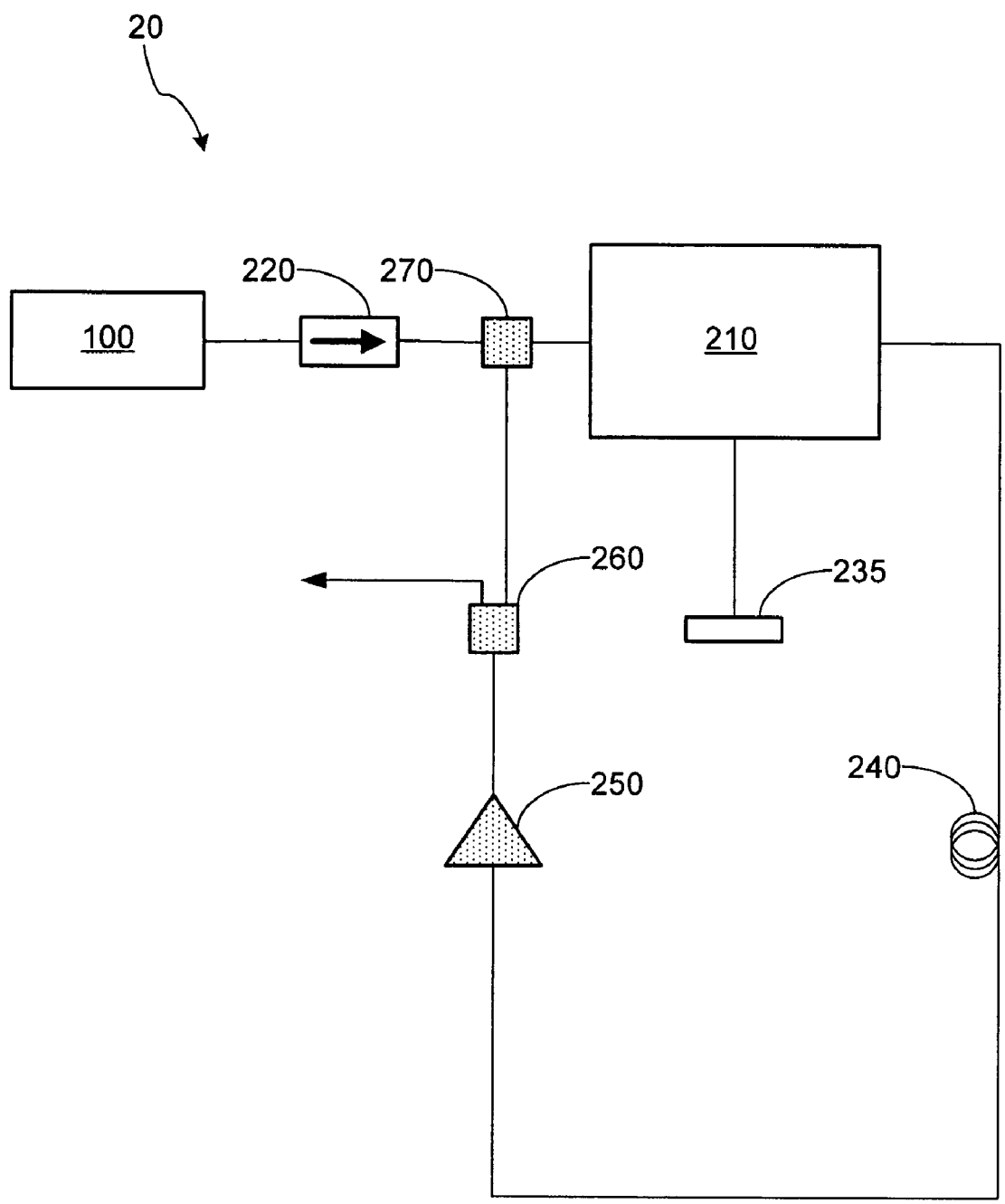
FIG. 2 is a block diagram of a multi-tone photonic oscillator as disclosed herein.

Referring to FIG. 2, a new implementation of a photonic oscillator 20 using an electroabsorption device serving a dual function as modulator and detector in accordance with the embodiments disclosed herein includes a laser source 100 emitting a continuous wave (CW) laser beam to be detected by an electroabsorption transceiver 210. The laser beam emitted by the laser source 100 is passed through an optical isolator 220 that prevents the propagation of circulating oscillation tones back into the optical branch containing the laser beam. A terminating electrical bandpass filter at the electrical port of the electroabsorption transceiver 210 provides an electric load $Z_L$ 235 selected to band limit the RF oscillation tones modulating the RF lightwave in the electroabsorption transceiver. The modulated RF lightwave is passed through a delay loop 240 and then through an optical amplifier 250 before being split in an optical splitter 260 to generate the oscillating RF lightwave carrier signal as well as an oscillating RF lightwave feedback signal that is combined with the laser beam generated by the laser source 100 by an optical combiner 270 prior to being detected by the electroabsorption transceiver. As well known to those skilled in the art, the delay loop may incorporate one or more delay paths having different parameters.

As known in the art, the random noise generated in the delay loop 240 of the oscillator 20 is the starting mechanism of subsequent oscillations as a result of positive loop feedback. The steady-state value of the electric field component of this random noise in the optical domain after repeated feedback circulation, amplification, and saturation, is denoted by $(P_{ss})^{1/2} \exp(j\omega_\lambda t + j\omega_m t)$, where $P_{ss}$ is the optical power of the steady-state oscillating tone, and $\omega_\lambda$ and $\omega_m$ are the optical frequency of the laser and electrical frequency of the RF multi-tones modulating the lightwave signal, respectively. The total optical power obtained by the combination of the power of the oscillating tone ($P_{ss}$) and the CW power of the laser beam generated by the laser source 100 ($P_0$) are then partially absorbed in the electroabsorption transceiver 210. The resulting photocurrent flowing through the modulator termination (i.e. load) consequently results in a voltage drop across the transceiver given by:

$$V_{mod} = \frac{1}{2}(P_0 + P_{ss}\sin\omega_m t)\alpha\rho Z_L \tag{1}$$

where $\alpha$ is the fractional absorption of the electroabsorption device, $\rho$ is its photocurrent conversion efficiency (A/W), and $Z_L$ is the device resistive termination. This induced electroabsorption modulator voltage in turn modulates the intensity of its transmitted RF lightwave signal.

Figure 3:
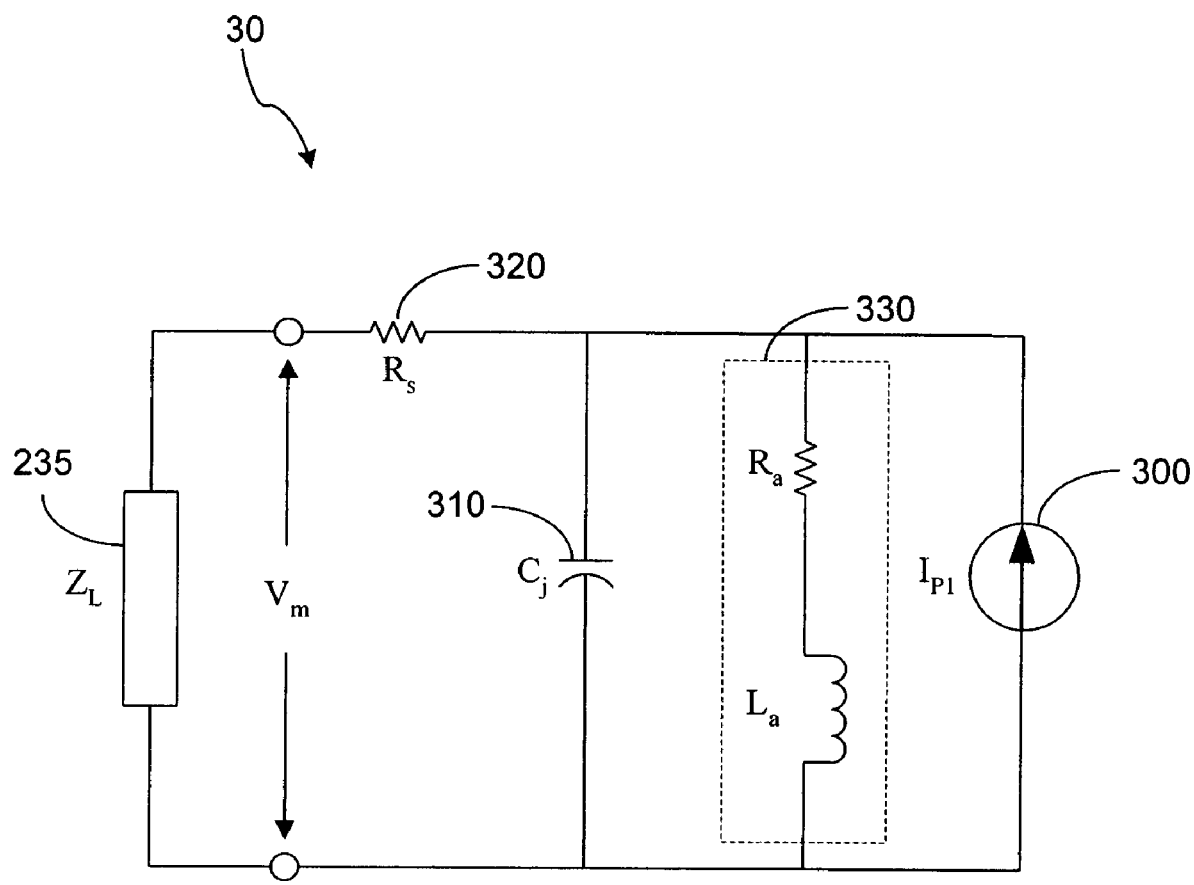
FIG. 3 is a diagram of an AC equivalent circuit for an electroabsorption optical transceiver for a multi-tone photonic oscillator as disclosed herein.

Equation (1) may be further refined by analyzing an equivalent AC electrical circuit of the electroabsorption transceiver 210, as shown in FIG. 3. The circuit 30 in FIG. 3 was originally published in the publication "RF-small-signal equivalent circuit of MQW InGaAs/InAlAs Electroabsorption Modulator," *Electronics Letters*, Vol. 33, pp 1822-1823, 1997, the entire contents of which are incorporated herein by reference thereto. The desired ac load termination $Z_L$ 235 of the electroabsorption transceiver 210 is applied to the AC circuit 30, which includes a current source $I_p$ 300 for modeling the photocurrent generated in the electroabsorption transceiver as a result of its detecting function, a reverse-biased junction capacitance $C_j$ 310 of the electroabsorption transceiver, and the transceiver series resistance $R_s$ 320. A series $R_a L_a$ branch 330 is connected in parallel with the junction capacitance $C_j$ 310, wherein $R_a$ is related to the optical responsivity of the transceiver and $L_a = \tau R_a$ where $\tau$ is the carrier escape time from the quantum wells of the transceiver. Modeling this equivalent circuit 30, the total steady-state optical power received $P_{opt}$ by the transceiver is $$P_{opt} = P_0 + P_{ss}\sin\omega t \tag{1a}$$

The total absorbed transceiver photocurrent $I_P$ is a sum of the DC absorbed photocurrent $I_{P0}$ and the AC absorbed photocurrent $I_{P1}$:

$$I_P = I_{P0} + I_{P1}\sin\omega t \tag{1b}$$

The photocurrent conversion efficiency $\rho$ of the transceiver is typically also comprised of a DC component $\rho_0$ and an AC component $\rho_1$:

$$\rho = \rho_0 + \rho_1 \sin\omega t \tag{1c}$$

The AC component $\rho_1$ of the photocurrent conversion efficiency may be expressed as:

$$\rho_1 = \frac{V_{m1}}{R_a P_0} \tag{1d}$$

where $V_{m1}$ is the AC component of the transceiver induced modulation voltage. The generated photocurrents thus become:

$$I_{P0} = \rho_0 I_0 \tag{1e}$$

$$I_{P1} = \frac{\rho_0 P_1}{1 + j\omega\tau} + \frac{\rho_1 P_0}{1 + j\omega\tau} \tag{1f}$$

Using the relationships defined above by equations 1a-1f and a generalized AC load termination $Z_L$, an analysis of the circuit 30 can provide a more accurate expression for the induced modulation voltage $V_{mod} = V_{m0} + V_{m1}\sin\omega t$. As will be appreciated by those skilled in the art, the RF band pass filtering function of the oscillator 20 can be adjusted via appropriate selection of the AC load termination $Z_L$ in conjunction with the other AC equivalent circuit parameters discussed above.

With continued reference to FIG. 2, the voltage dependent transmission characteristics of an electroabsorption modulator is, generally:

$$T(V) = T_0 \exp\left(-\frac{V}{V_0}\right)^n \quad (2)$$

where $T_0$ is the zero-bias transmission of the modulator, or its insertion loss, and $V_0$ and n are empirical parameters related to the shape of the transmission vs. voltage characteristics of the modulator. Substituting the induced modulator voltage from equation (1) into the transmission-voltage characteristics in equation (2) results in:

$$T(V_{mod}) = T_0 \exp\left[-\frac{(V_B + V_{ss}\sin\omega_m t)}{V_0}\right]^n \quad (3)$$

where $V_B = 0.5 P_0 \alpha \rho R_L$ and $V_{ss} = 0.5 P_{ss} \alpha \rho R_L$ and are the induced bias and small-signal RF modulator voltages, respectively. Assuming n=1 for ease of calculation, and using a Taylor series expansion of (3) with the first few terms, the following relationship for the modulator optical transmission as a function of the self-induced modulator voltage parameters described above is obtained:

$$\frac{T(V_{mod})}{T_0} = \exp\left(-\frac{V_B}{V_0}\right)\left[1 + \frac{V_{ss}^2}{4V_0^2} - \left(\frac{V_{ss}}{V_0} + \frac{V_{ss}^3}{8V_0^3}\right)\sin\omega_m t - \frac{V_{ss}^2}{4V_0^2}\cos 2\omega_m t + \frac{V_{ss}^3}{24V_0^3}\sin 3\omega_m t\right]^n \quad (4)$$

The output optical power of the modulator as a function of the input optical power and the modulator transmission characteristics described in (4) above is given by:

$$P_{out} = \frac{1}{2}\beta(P_0 + P_{ss}\sin\omega_m t)T(V_{mod}) \quad (5)$$

where $\beta$ is the modulator insertion loss. Combining equations (4) and (5), expanding the terms above, and using known trigonometric identities, the modulated output optical power of the modulator as a result of the induced voltage may be expressed as:

$$P_{out} = \frac{1}{2}P_0\beta\left[P_0\left(\frac{V_{ss}}{V_0} + \frac{V_{ss}^3}{8V_0^3}\right) + P_{ss}\left(1 + \frac{V_{ss}^2}{4V_0^2} + \frac{V_{ss}^3}{8V_0^3}\right)\right]\exp\left(-\frac{V_B}{V_0}\right) \quad (6)$$

Equation (6) may be simplified by dropping the second and higher powers of small signal RF voltage $V_{ss}$, and substituting $V_{ss}$ for $P_{ss}$, to obtain the following relationship between the modulated power levels at the output of the optical amplifier 250 and the input of the optical combiner 270:

$$G_{OL} = \frac{P_{out}}{P_{ss}} = \frac{1}{2}\beta\exp\left(-\frac{V_B}{V_0}\right)\left[\frac{P_0 \alpha \rho R_L}{2V_0} + 1\right]G_{OA} \quad (7)$$

where $G_{OL}$ and $G_{OA}$ are the open loop gain and the optical amplifier power gains, respectively. Equation 7 thus defines the small-signal open loop gain of the photonic oscillator 20.

RF oscillations modulating the lightwave at frequency intervals equal to the inverse of the loop delay time will occur only if the above open loop gain ($G_{OL}$) is above unity. Substituting $\exp(-V_B/V_0)/V_0 = \Pi/V_\Pi$, where $V_\Pi$ is the equivalent "half-voltage" of the electroabsorption modulator, results in the following relationship for the oscillator open loop gain:

$$G_{OL} = \frac{1}{2}\beta\left[\frac{P_0 \alpha \rho Z_L}{2V_\pi} + \exp\left(-\frac{V_B}{V_0}\right)\right]G_{OA} \quad (8)$$

The first term in the bracket in equation 8 is similar to the RF gain obtained in an optical link consisting of an electroabsorption modulator with an insertion loss $\beta$, a fractional absorption of $\alpha$, and an equivalent "half-voltage" $V_\Pi$, and a photodetector with a detectivity $\rho$ and a load resistance $Z_L$ fed by a laser with CW power $P_0$. The second term is an artifact of this implementation of a photonic oscillator 20 as disclosed herein. Thus, one of the consequences of this oscillator configuration is that it reduces the gain required by the optical amplifier to achieve an open loop gain above unity. For purposes of illustrating the significant benefits conferred by the novel photonic oscillator disclosed herein, we may assume $P_0 = 20$ mW, $\alpha = 0.5$, $\rho = 0.5$ A/W, $\beta = -5$ dB, $V_\Pi = 1$ V and $Z_L = 50\Omega$ to obtain for the contribution of the first term in equation 8 to the open loop gain a value of 0.125. The self-induced bias voltage of the modulator given by $V_B = 0.5 P_0 \alpha \rho Z_L$ is 0.125 V. From the definition of the electroabsorption modulator equivalent "half-voltage", exp $(-V_B/V_0)/V_0 = \Pi/V_\Pi$, $V_0 = 0.1$ V can be deduced when $V_\Pi = 1$ V. Thus the second term in equation 8, $\exp(-V_B/V_0)$, is equal to 0.28 and therefore without the novel use of the electroabsorption device as a simultaneous modulator and detector, an optical amplifier gain of about 17 dB would be required to obtain an open loop gain of more than unity in a photonic oscillator with a feedback loop consisting of an optical link with the same modulator and a separate photodetector with equivalent detectivity. For a photonic oscillator with the novel implementation of the electroabsorption device as dual modulator/detector, the gain required from the optical amplifier to have an oscillator open loop gain above unity would only be about 12 dB using the same parameter values given above. This reduction in the minimum value of the optical amplifier gain is a result of the addition of the second term in the photonic oscillator open loop relationship in equation 8, which is a direct consequence of the novel dual usage of the electroabsorption device as an optical modulator and detector. This lower requirement for the optical amplifier minimum gain translated into a lower amplifier noise, and hence, a lower photonic oscillator phase noise.

As will be appreciated by those skilled in the art, a significant advantage of a photonic oscillator as disclosed herein is the reduction in complexity, and hence fabrication cost. Furthermore, avoiding use of FET-based electrical amplifiers may improve the flicker noise contribution to the device phase noise. Also, as explained above, the novel photonic oscillator disclosed herein reduces the gain requirement of an optical amplifier required in an equivalent oscillator with a feedback loop consisting of an optical link with an electroabsorption modulator, an optical amplifier, and a photodetector. The use of the electroabsorption device as a photodetector further allows the addition of electrical bandpass filters to the photonic oscillator that would not otherwise be possible in an all-optical oscillator configuration. The electrical bandpass filter has the advantage of obtaining pre-selected RF bands at the output of the photonic oscillator.

Although the preceding discussion has been predicated upon the use of an electroabsorption optical transceiver, it must be understood that the novel concepts presented and claimed herein are not limited solely to use with this type of optical modulator, and any type of optical modulator offering the requisite dual functionality of modulator and detector may be employed in accordance with the principles disclosed herein.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

What is claimed is:

1. A photonic oscillator, comprising:
   an optical combiner configured to combine a laser beam with a second RF lightwave signal to generate a first RF lightwave signal;
   an optical transceiver configured to detect the first RF lightwave signal, electrically filter the detected first RF lightwave signal, and modulate the detected first RF lightwave signal in accordance with the filtered first RF lightwave signal;
   an optical delay path configured to delay the modulated first RF lightwave signal; and
   an optical splitter configured to split the delayed modulated first RF lightwave signal into the second RF lightwave signal and a third RF lightwave signal.

2. The photonic oscillator of claim 1, further comprising:
   a laser light source to emit the laser beam.

3. The photonic oscillator of claim 1, wherein the optical transceiver is an electroabsorption optical transceiver.

4. The photonic oscillator of claim 1, further comprising:
   an optical amplifier in the optical delay path to amplify the delayed modulated first RF lightwave signal.

5. The photonic oscillator of claim 1, further comprising:
   an electrical circuit connected to the optical transceiver to electrically filter the detected first RF lightwave signal.

6. The photonic oscillator of claim 5, wherein the electrical circuit comprises:
   an electrical load.

7. A method for generating an optical oscillating signal, comprising:
   generating a laser beam;
   combining the laser beam with a second RF lightwave signal to generate a first RF lightwave signal;
   detecting the first RF lightwave signal in an optical transceiver;
   electrically filtering the detected first RF lightwave signal in the optical transceiver;
   modulating the detected first RF lightwave signal in accordance with the filtered first RF lightwave signal in the optical transceiver;
   delaying the modulated first RF lightwave signal; and
   splitting the delayed modulated first RF lightwave signal into the second RF lightwave signal and a third RF lightwave signal.

8. The method of claim 7, wherein the optical transceiver is an electroabsorption optical transceiver.

9. The method of claim 7, further comprising:
   amplifying the delayed modulated first RF lightwave signal prior to splitting it into the second RF lightwave signal and the third RF lightwave signal.

10. The method of claim 7, wherein electrically filtering the detected first RF lightwave signal comprises:
    band-pass filtering the detected first RF lightwave signal.

* * * * *